Patented Sept. 30, 1952

2,612,511

UNITED STATES PATENT OFFICE 2,612,511

PREPARATION OF HEXAALKOXYDISILANES

Bernard A. Orkin, Philadelphia, Pa., assignor to Socony-Vacuum Oil Company, Incorporated, a corporation of New York No Drawing. Application September 22, 1948, Serial No. 50,669

8 Claims. (Cl. 260—448.8)

This invention relates, broadly, to synthetic lubricants having a combination of desirable properties, namely, high viscosity indices, low pour points, and good stability. It is more particularly concerned with compounds having the formula, $(RO)_3SiSi(OR)_3$, wherein R is an aliphatic, an alicyclic, an aryl, an aralkyl, or a heterocyclic radical, which have the aforementioned combination of desirable properties, and with a novel method for their preparation.

The preparation of products having the formula, $(RO)_3SiSi(OR)_3$, and, more specifically, hexaalkoxydisilanes, has been described by Dolgov and Volnov [J. Gen. Chem. (USSR), 1, 330 (1931); see C. A. 26, 2168 (1932)]. These compounds were prepared by the reduction of the corresponding orthosilicate ester, in accordance with the following equation:

(1) 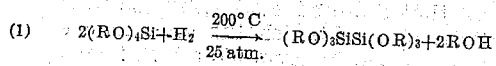

It is to be noted, however, that the products which have been prepared in accordance with the reaction exemplified by this equation, have low viscosities which render them unsuitable as lubricants.

It has now been found that synthetic lubricants having the formula $(RO)_3SiSi(OR)_3$, wherein R is as set forth hereinbefore, and having the aforementioned combination of properties can be prepared by a method which is simple and efficient. It has now been discovered that compounds having the formula, $(RO)_3SiSi(OR)_3$, can be prepared by reacting a hexahalodisilane with an alcohol or a phenol in accordance with the following equation:

(2) 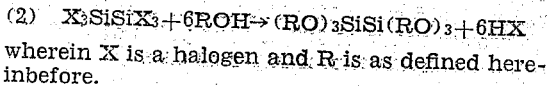

wherein X is a halogen and R is as defined hereinbefore.

Accordingly, it is a broad object of the present invention to provide new synthetic lubricants. Another object is to provide a novel method for producing them which is simple and efficient. A further object is to provide synthetic lubricants having the formula, $(RO)_3SiSi(OR)_3$, wherein R is as set forth hereinbefore, which have high viscosity indices, low pour points, and good stability. Other objects and advantages of the present invention will become obvious to those skilled in the art from the following detailed description.

Broadly stated, the present invention provides synthetic lubricants having high viscosity indices, low pour points, and good stability, which comprise compounds having the formula,

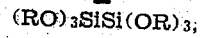

where R is an aliphatic, an alicyclic, an aryl, an aralkyl, or a heterocyclic radical; in which the total number of carbon atoms and heterocyclic atoms in each molecule varies between about 42 and about 60; and a method for producing them, which comprises reacting a hexahalodisilane with an alcohol or a phenol.

The alcohol or phenol reactants utilizable in preparing the synthetic lubricants of the present invention are the monohydroxy aliphatic alcohols, alicyclic alcohols, aromatic alcohols, and heterocyclic alcohols, and phenols. Non-limiting examples are heptanol-1, 2-ethylhexanol-1, octanol-1, octanol-2, decanol-1, cyclopentanol, cyclohexanol, 2-methylcyclohexanol, 3-methylcyclohexanol, phenol, 2-methylphenol, 3-methylphenol, 4-methylphenol, benzyl alcohol, α-naphthol, β-naphthol, α-tetralol, 2-hydroxy-5-methylthiophene, 2-hydroxypyridine, 3-hydroxypyridine, furfuryl alcohol, and 8-hydroxyquinoline. The preparation of these materials is set forth in the literature and many of them are available in commercial quantities.

The number of carbon atoms or heterocyclic atoms present in the alcohol or phenol reactant is limited solely by the requirement, mentioned hereinbefore, that the sum of the number of carbon atoms and heterocyclic atoms in each mole of product must be between about 42 and about 60. Generally speaking, in order to obtain relatively pure compounds having the same number of atoms per radical, the alcohol or phenol reactant should contain at least seven carbon atoms and heterocyclic atoms per molecule to achieve the required minimum sum of 42 in the product. It must be understood, however, that is within the concept of the present invention to use a mixture of different alcohols and/or phenols to prepare the synthetic lubricant products, so long as the minimum number of atoms in the product is achieved. Such products will not be pure compounds, but, nevertheless, they will possess the aforementioned desired properties of a synthetic lubricant.

As will be apparent to those skilled in the art, the process of the present invention is applicable to the preparation of compounds having fewer than 42 carbon atoms and heterocyclic atoms. For example, hexaethoxydisilane, having 12 carbon atoms per molecule, can be prepared by the reaction between a hexahalodisilane and ethanol, in accordance with the process of the present invention. Such products having fewer than 42 atoms per molecule will not be utilizable as synthetic lubricants, as contemplated herein, but they will be useful as solvents, plasticizers, etc. The preparation of these products is considered to be within the scope of the present invention.

The hexahalodisilane reactants utilizable herein are hexachlorodisilane, hexabromodisilane, hexaiodisilane, and hexafluorodisilane. Of these, hexachlorodisilane and hexabromodisilane are especially preferred.

As shown in the equation exemplifying the reaction contemplated herein, the alcohol or phenol reactant is reacted with the hexahalodisilane reactant in a proportion of about six moles of alcohol or phenol reactant for each mole of hexhalodisilane reactant. In practice, however, it is preferable to use an excess of about one mole of the alcohol or phenol reactant, i. e., a total of about seven moles per mole of hexahalodisilane. For practical reasons, it is preferable to carry out the reaction in a non-polar hydrocarbon solvent. Especially preferred for this purpose are the aromatic hydrocarbon solvents, such as, for example, benzene, toluene, and xylene. The amount of solvent to be used will vary between about 5 per cent and about 50 per cent, based on the total weight of the reactants.

The temperature of the reaction is not a critical factor. In general, the temperature will be the reflux temperature of the solvent used, and preferably, it varies between about 80° C. and about 140° C. The time of the reaction will depend on the temperature employed. In practice, the reaction is complete after heating the reaction mixture, at the preferred temperature, for a period of time varying between about two hours and about six hours, after all reactants have been added.

The desired reaction product is isolated by distilling off, under reduced pressure, excess alcohol or phenol reactant, any unreacted hexahalodisilane, and the non-polar hydrocarbon solvent. The desired synthetic lubricant product is recovered as the residue from the distillation operation.

The following specific examples are for the purposes of illustrating modes of preparing the compounds having the formula, $(RO)_3SiSi(OR)_3$ of the present invention, and for the purpose of demonstrating the advantages thereof as synthetic lubricants. It is to be clearly understood, however, that the invention is not to be limited to the specific alcohol or phenol reactants and hexachlorodisilane reactant, or to the operations and manipulations described in the examples. As will be apparent to those skilled in the art, other reactants, as set forth hereinbefore, may be used to prepare a wide variety of products in accordance wtih this invention.

EXAMPLE 1

Hexa(hexoxy)disilane

To 26.9 grams of hexachlorodisilane in 150 cubic centimeters of benzene were added 70 grams of hexanol-1. The reaction mixture was heated at reflux temperature (about 80° C.) for about four hours. Volatile materials, solvent and unreacted reactants, were removed by topping the crude reaction product at 250° C. under a pressure of four millimeters. The product, after filtration through filtering clay, weighed 55 grams. It was a light yellow mobile liquid having the properties set forth in Table I.

EXAMPLE 2

Hexa(2-ethylhexoxy)disilane

Into a solution of 26.9 grams of hexachlorodisilane in 250 cubic centimeters of benzene, were introduced 91 grams of 2-ethylhexanol-1. The reaction solution was refluxed (at about 80° C.) for about 3 hours and then topped at 250° C. under a pressure of four millimeters. The topped product was filtered through filtering clay. The product thus obtained was a slightly viscous oil weighing 70 grams. Analysis showed that this product contained 7.15 per cent silicon (calculated 6.99 per cent). Pertinent data for this product are set forth in Table I.

EXAMPLE 3

Hexa(octoxy)disilane

To 26.9 grams of hexachlorodisilane in 200 cubic centimeters of benzene were added dropwise 91 grams of octanol-1. The reaction was carried out and the product isolated in the manner set forth in Example 2. The 74 grams of light yellow oil thus obtained contained 6.96 per cent silicon (calculated 6.99 per cent). Pertinent data appear in Table I.

TABLE I

| Example | Pour Point, °F. | Kinematic Viscosity, Centistokes | | Viscosity Index |
|---|---|---|---|---|
| | | @ 100° F. | @ 210° F. | |
| 1 | <-65 | 7.94 | 2.80 | 203 |
| 2 | <-65 | 17.49 | 4.99 | 195 |
| 3 | -25 | 13.16 | 3.98 | 218 |

From the data set forth in Table I, it will be apparent that the products having the formula, $(RO)_3SiSi(OR)_3$, in which the total number of carbon atoms and heterocyclic atoms is at least 42, are excellent synthetic lubricants having high viscosity indices and low pour points. The criticalness of the minimum total number of carbon and heterocyclic atoms is demonstrated by the data for the product of Example I. This product has 36 carbon atoms per molecule and its low viscosity renders the product unsuitable for purposes of lubrication.

The stability of synthetic lubricants of this type is illustrated by the data in Table II, obtained by comparing a sample of the product of Example 2 with an SAE 10 motor oil in a laboratory bench-scale oxidation test. The motor oil used for comparative purposes is an oil obtained from a paraffinic crude and has a kinematic viscosity of 40.5 cs. at 100° F. and 5.99 cs. at 210° F., a viscosity index of 100, a pour point of +5° F., and a neutralization number of 0.05.

TABLE II

| Sample | N. N.[1] | Viscosity Increase, Percent | Tube Sludge | Lead Loss, Mg. |
|---|---|---|---|---|
| Example 2 | 1.4 | 36 | None | 2.2 |
| SAE 10 Oil | 15.0 | 95.0 | None | 235.0 |

[1] Neutralization Number = Mg. KOH required to neutralize 1 gram of oil sample.

In the test from which the data set forth in Table II were obtained, a 50-milliliter sample of test oil was placed in a test tube containing an oxidation catalyst comprising 15.6 square inches of iron, 0.78 square inch of copper, 0.87 square inch of aluminum, and a lead piece having a surface area of 0.16 square inch. The tube was placed in a constant temperature bath at about 300° F. A gas delivery tube was inserted into the oil and dry air was passed through the oil at a rate of five liters per hour. After 40 hours, the tube was removed and examined for sludge. The sludging of the oil forms a criterion of the tendency of the lubricant to form insoluble substances, organic and inorganic. The lead piece, which had been carefully weighed prior to the test, was removed and carefully weighed. The loss in weight indicates the tendency of the lubricant to attack lead-containing bearing surfaces. The viscosity increase reveals the tendency of the lubricant toward polymerization. The neutralization number is a measure of the susceptibility of the lubricant to oxidize to acidic substances.

From the data set forth in Table II, it will be apparent that the synthetic lubricants of the present invention are superior to mineral lubricating oils. They are not susceptible to oxidation, there is little tendency toward polymerization, and, finally, there is very little attack on lead bearing surfaces.

In addition to their utility as synthetic lubricants, per se, the products of the present invention are, in general, completely soluble in mineral lubricating oils. Accordingly, they can be used as extenders for lubricants, or as additives to lubricating oils for the purpose of imparting desirable properties thereto.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. A process for the production of compounds having the formula, $(RO)_3SiSi(OR)_3$, wherein R is a radical selected from the group consisting of aliphatic, alicyclic, aryl, aralkyl, thienyl, pyridyl, furfuryl, and quinolyl radicals, which comprises reacting a hydroxy compound selected from the group consisting of monohydroxyphenols and monohydroxy alcohols, with a hexahalodisilane in an aromatic hydrocarbon solvent, and at a temperature of between about 80° C. and about 140° C.; said hydroxy compound being used in amounts equivalent to an excess over six moles for each mole of hexahalodisilane.

2. A process for the production of hexa(2-ethylhexoxy)disilane, which comprises reacting 2-ethylhexanol-1, with a hexahalodisilane in an aromatic hydrocarbon solvent, and at a temperature of between about 80° C. and about 140° C.; said 2-ethylhexanol-1 being used in amounts equivalent to an excess over six moles for each mole of hexahalodisilane.

3. A process for the production of hexa(2-ethylhexoxy)disilane, which comprises reacting 2-ethylhexanol-1 with hexachlorodisilane in benzene and at a temperature of between about 80° C. and about 140° C.; said 2-ethylhexanol-1 being used in amounts equivalent to an excess over six moles for each mole of hexachlorodisilane.

4. A process for the production of hexaoctoxydisilane, which comprises reacting octanol-1 with a hexahalodisilane in an aromatic hydrocarbon solvent, and at a temperature of between about 80° C. and about 140° C.; said octanol-1 being used in amounts equivalent to an excess over six moles for each mole of hexahalodisilane.

5. A process for the production of hexaoctoxydisilane, which comprises reacting octanol-1 with hexachlorodisilane in benzene, and at a temperature of between about 80° C. and about 140° C.; said octanol-1 being used in amounts equivalent to an excess over six moles for each mole of hexachlorodisilane.

6. A compound having the formula $$(RO)_3SiSi(OR)_3$$

wherein R is a radical selected from the group consisting of aliphatic, alicyclic, aryl, aralkyl, thienyl, pyridyl, furfuryl, and quinolyl radicals, in which the total number of carbon atoms and heterocyclic atoms in each molecule varies between about 42 atoms and about 60 atoms.

7. Hexa(2-ethylhexoxy)disilane.

8. Hexa(octoxy)disilane.

BERNARD A. ORKIN.

REFERENCES CITED

The following references are of record in the file of this patent:

Martin: J. Chem. Soc. (London), vol. 105, pp. 2860–72 (1914).

Dolgov et al.: J. Gen. Chem. (U. S. S. R.) 1, No. 2, 330–39 (1931).

Abrahamson et al.: J. Org. Chem., vol. 13, Mar. 1948, pp. 275–79.